(12) United States Patent
Hecht

(10) Patent No.: US 11,020,844 B2
(45) Date of Patent: Jun. 1, 2021

(54) HAND-HELD POWER TOOL INCLUDING A MODE-SETTING UNIT

(71) Applicant: Robert Bosch GmbH, Stuttgart (DE)

(72) Inventor: Joachim Hecht, Magstadt (DE)

(73) Assignee: ROBERT BOSCH GMBH, Stuttgar (DE)

( * ) Notice: Subject to any disclaimer, the term of this patent is extended or adjusted under 35 U.S.C. 154(b) by 223 days.

(21) Appl. No.: 15/730,308

(22) Filed: Oct. 11, 2017

(65) Prior Publication Data

US 2018/0133879 A1   May 17, 2018

(30) Foreign Application Priority Data

Nov. 11, 2016  (DE) ........................ 1020162221787.7

(51) Int. Cl.
| | |
|---|---|
| *B23B 45/00* | (2006.01) |
| *B25D 11/10* | (2006.01) |
| *B25D 16/00* | (2006.01) |
| *B25F 5/00* | (2006.01) |

(52) U.S. Cl.
CPC .......... *B25D 16/006* (2013.01); *B23B 45/008* (2013.01); *B25D 11/102* (2013.01); *B25D 16/003* (2013.01); *B25F 5/001* (2013.01); *B25D 2216/0023* (2013.01); *B25D 2216/0038* (2013.01); *B25D 2250/005* (2013.01); *B25D 2250/165* (2013.01)

(58) Field of Classification Search
CPC .......... B25D 16/006; B25D 2216/0092; B25B 21/02

USPC ...................................................... 173/48, 47
See application file for complete search history.

(56) References Cited

U.S. PATENT DOCUMENTS

| | | | | |
|---|---|---|---|---|
| 6,152,242 A | * | 11/2000 | Chung | B25D 16/00 173/216 |
| 7,896,097 B2 | * | 3/2011 | Teng | B25B 21/02 173/178 |
| 2010/0084151 A1 | * | 4/2010 | Kuhnle | B25D 16/006 173/47 |
| 2011/0000692 A1 | * | 1/2011 | Roehm | B23B 31/008 173/47 |
| 2012/0111592 A1 | * | 5/2012 | Limberg | B25B 21/026 173/48 |
| 2013/0333907 A1 | * | 12/2013 | Hecht | B25B 23/141 173/48 |

(Continued)

*Primary Examiner* — Thanh K Troung
*Assistant Examiner* — Patrick B Fry
(74) *Attorney, Agent, or Firm* — Norton Rose Fulbright US LLP; Gerard A. Messina

(57) ABSTRACT

In a hand-held power tool including a gear for driving an output shaft, which is situated in an assigned gear housing, and including a mode-setting unit for setting the operating mode for an impact drilling mode, a drilling mode, or a screwing mode, the mode-setting unit including a rotatable actuating element and a rotatable setting element coupled to the rotatable actuating element. The setting element is coupled, at least in one operating mode, to a transmission element which is mounted on the gear housing and is axially displaceable on the gear housing in a screwing position assigned to the screwing mode and is axially fixed on the gear housing in impact drilling and drilling positions assigned to the impact drilling and drilling modes. The actuating element and the setting element are formed as one piece from plastic.

15 Claims, 7 Drawing Sheets

(56) References Cited

U.S. PATENT DOCUMENTS

| | | | | |
|---|---|---|---|---|
| 2014/0242888 A1* | 8/2014 | Boeck | ............... | B25F 5/00 |
| | | | | 451/358 |
| 2014/0262389 A1* | 9/2014 | Simeone | ............ | B23B 45/02 |
| | | | | 173/1 |
| 2015/0135872 A1* | 5/2015 | Wang | ............... | F16H 3/78 |
| | | | | 74/333 |

* cited by examiner

HAND-HELD POWER TOOL INCLUDING A MODE-SETTING UNIT

CROSS REFERENCE

The present application claims the benefit under 35 U.S.C. § 119 of German Patent Application No. DE 102016222178.7 filed on Nov. 11, 2016, which is expressly incorporated herein by reference in its entirety.

BACKGROUND INFORMATION

The present invention relates to a hand-held power tool including a gear for driving an output shaft, which is situated in an assigned gear housing, and including a mode-setting unit for setting the operating mode for an impact drilling mode, a drilling mode, or a screwing mode, the mode-setting unit including a rotatable actuating element and a rotatable setting element coupled to the rotatable actuating element, a particular operating mode being settable by way of a rotation of the setting element, which is effectuatable via a rotation of the actuating element, and the setting element being coupled, at least in one operating mode, to a transmission element which is mounted on the gear housing and is axially displaceable on the gear housing in a screwing position assigned to the screwing mode and is axially fixed on the gear housing in impact drilling and drilling positions assigned to the impact drilling and drilling modes.

A conventional hand-held power tool includes a gear for driving an output shaft situated in a gear housing. This hand-held power tool may be operated in different operating modes, namely an impact drilling mode, a drilling mode, or a screwing mode. In order to set the operating modes, a mode-setting unit is utilized, which includes a rotatable actuating element and a rotatable setting element coupled to the rotatable actuating element. In this case, a particular operating mode is settable by way of a rotation of the setting element, which is effectuatable via a rotation of the actuating element. The setting element is coupled, at least in one operating mode, to a transmission element which is mounted on the gear housing and is axially displaceable on the gear housing in a screwing position assigned to the screwing mode and is axially fixed on the gear housing in impact drilling and drilling positions assigned to the impact drilling and drilling modes.

SUMMARY

The present invention provides a hand-held power tool including a gear for driving an output shaft, which is situated in an assigned gear housing, and including a mode-setting unit for setting the operating mode for an impact drilling mode, a drilling mode, or a screwing mode, the mode-setting unit including a rotatable actuating element and a rotatable setting element coupled to the rotatable actuating element, a particular operating mode being settable by way of a rotation of the setting element, which is effectuatable via a rotation of the actuating element, and the setting element being coupled, at least in one operating mode, to a transmission element which is mounted on the gear housing and is axially displaceable on the gear housing in a screwing position assigned to the screwing mode and is axially fixed on the gear housing in impact drilling and drilling positions assigned to the impact drilling and drilling modes. The actuating element and the setting element are formed as one piece from plastic and are supported in the axial direction of the output shaft on a side of the gear housing facing a free end of the output shaft.

The present invention therefore makes it possible to provide a hand-held power tool in which a reduced number of components is utilized due to the mode-setting unit being formed as one piece, whereby a robust and reliable mode-setting unit may be simultaneously provided. In this case, it may be made possible to provide a reliable and secure mode-setting unit.

The gear housing preferably includes at least one recess for accommodating sections of the setting element. A way of enabling the setting element to rest against the gear housing may therefore be made possible in a simple way.

Preferably, the at least one recess forms an axial support element for axially supporting the setting element in the direction of the free end of the output shaft. A simple and uncomplicated way support of the setting element on the gear housing in the direction of the free end of the output shaft may therefore be made possible.

According to one specific embodiment, the actuating element and the setting element are both designed in the shape of a sleeve. It may therefore be made possible to set an operating mode in a secure and reliable way via a rotation of the actuating element and the setting element.

The mode-setting unit preferably includes at least one blocking element, by way of which the transmission element is axially fixed in the assigned impact drilling or drilling position on the gear housing in the impact-drilling or drilling mode, the at least one blocking element unblocking the transmission element in the axial direction in the screwing mode. An activation and/or deactivation of the transmission element may therefore be made possible in a simple way.

The at least one blocking element is preferably situated on a side of the actuating element facing away from the free end of the output shaft. A blocking element may therefore be provided, which may axially block and unblock the transmission element.

A detent mechanism for generating impacts in the impact drilling mode is preferably assigned to the output shaft, the setting element including at least one deactivating element for deactivating the detent mechanism. An activation and deactivation of the detent mechanism may therefore be made possible in an uncomplicated and secure way.

According to one specific embodiment, the at least one blocking element and/or the at least one deactivating element are/is formed as one piece with the setting element. A simple and compact setting element may therefore be provided.

The transmission element is preferably connected to the gear housing in a rotatably fixed manner. A simple and uncomplicated arrangement of the transmission element on the gear housing may therefore be made possible.

The setting element and the transmission element are preferably rotatable relative to each other. Therefore, an axial movement of the transmission element in the impact drilling mode may be made possible.

The transmission element is preferably designed in the shape of a disk. A suitable transmission element may therefore be provided in a simple way.

BRIEF DESCRIPTION OF THE DRAWINGS

The present invention is described in greater detail in the description below, with reference to exemplary embodiments represented in the figures.

DETAILED DESCRIPTION OF EXAMPLE EMBODIMENTS

Figure 1:
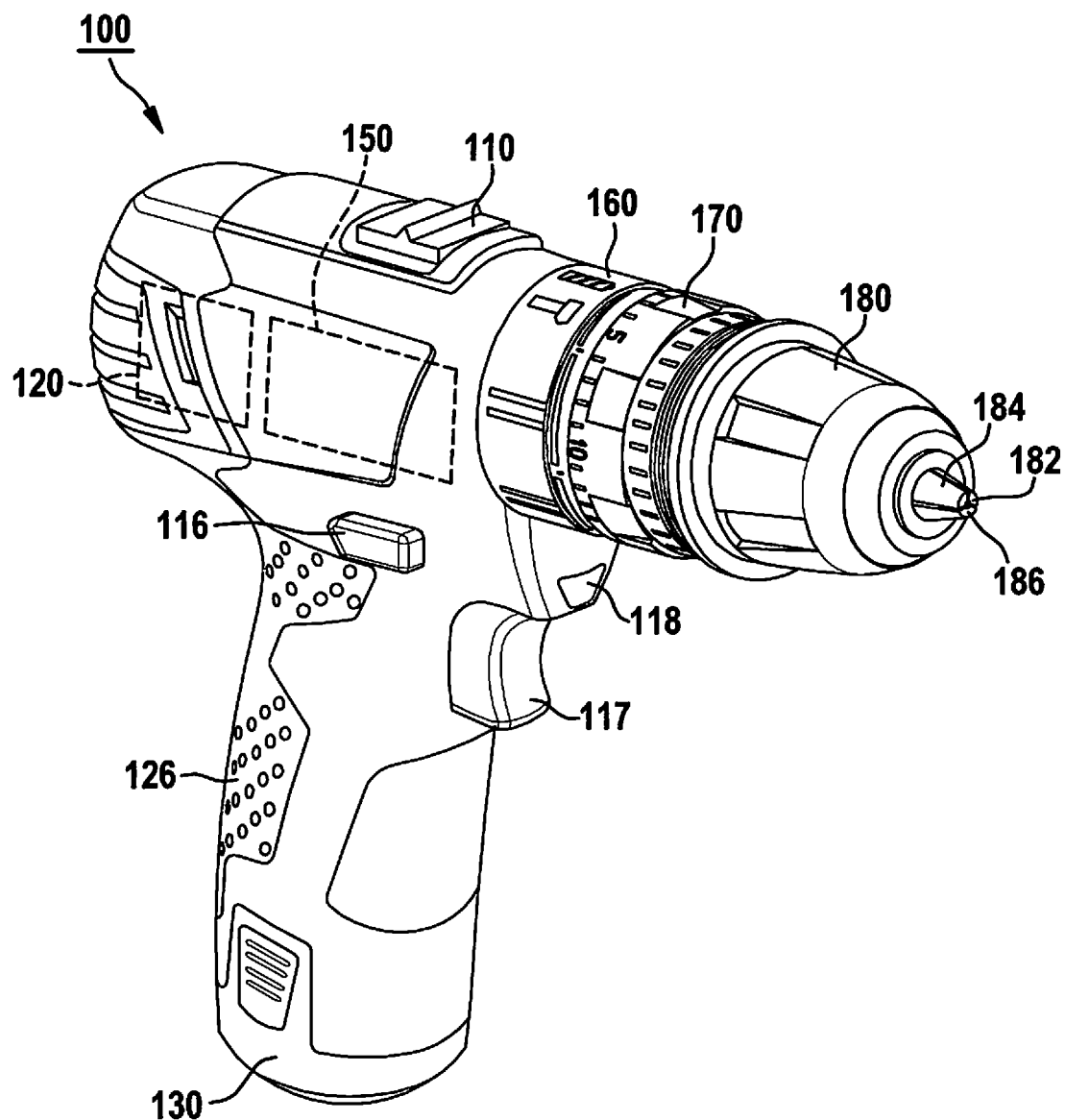
FIG. 1 shows a perspective view of a hand-held power tool including a gear and a mode-setting unit for setting an operating mode.

FIG. 1 shows an exemplary hand-held power tool 100 including a housing 110, in which at least one drive motor 120 is situated for driving an insertable tool which is situatable in a tool holder 180 and is preferably exchangeable. As demonstrated, tool holder 180 is designed as a chuck attachment including, as demonstrated, three chuck jaws 182, 184, 186, although the tool holder could also be designed as a quick release chuck.

Housing 110 preferably includes a handle 126 including a manual switch 117. Drive motor 120 is actuatable, i.e., switchable on and off, via manual switch 117, for example, and is preferably electronically controllable or regulatable in such a way that a reversing mode as well as set points related to a desired rotational speed are achievable. In addition, a rotation direction switch 116 is preferably situated in the area of manual switch 117, via which a rotational direction of drive motor 120 or an output shaft (220 in FIG. 2) assigned to drive motor 120 is optionally settable. Moreover, hand-held power tool 100 is preferably connectable to a rechargeable battery pack 130 for battery-supplied power; alternatively thereto, the hand-held power tool may also be operated using mains-supplied power.

Hand-held power tool 100 preferably includes a switchable gear 150 which may be switched at least between a first and a second gear, preferably between a first, second, and third gear. Hand-held power tool 100 is preferably designed as a type of impact drill or combi drill, the first gear corresponding, for example, to a screwing mode and the second gear corresponding to a drilling mode or an impact drilling mode. According to one specific embodiment, the screwing mode is assigned to the first gear, the drilling mode is assigned to the second gear, and the impact drilling mode is assigned to the third gear. A mode-setting unit 160 is used for setting the different operating modes. Preferably, an operating mode is settable by way of a rotation in the circumferential direction of mode-setting unit 160.

In addition, an optional work-area illumination unit 118 is situated, by way of example, on housing 110, in the area of tool holder 180, as demonstrated, for the purpose of illuminating a work area of hand-held power tool 100. In addition, an optional torque-limiting unit 170 for setting a maximum transmissible torque is assigned to tool holder 180, as demonstrated.

Figure 2:
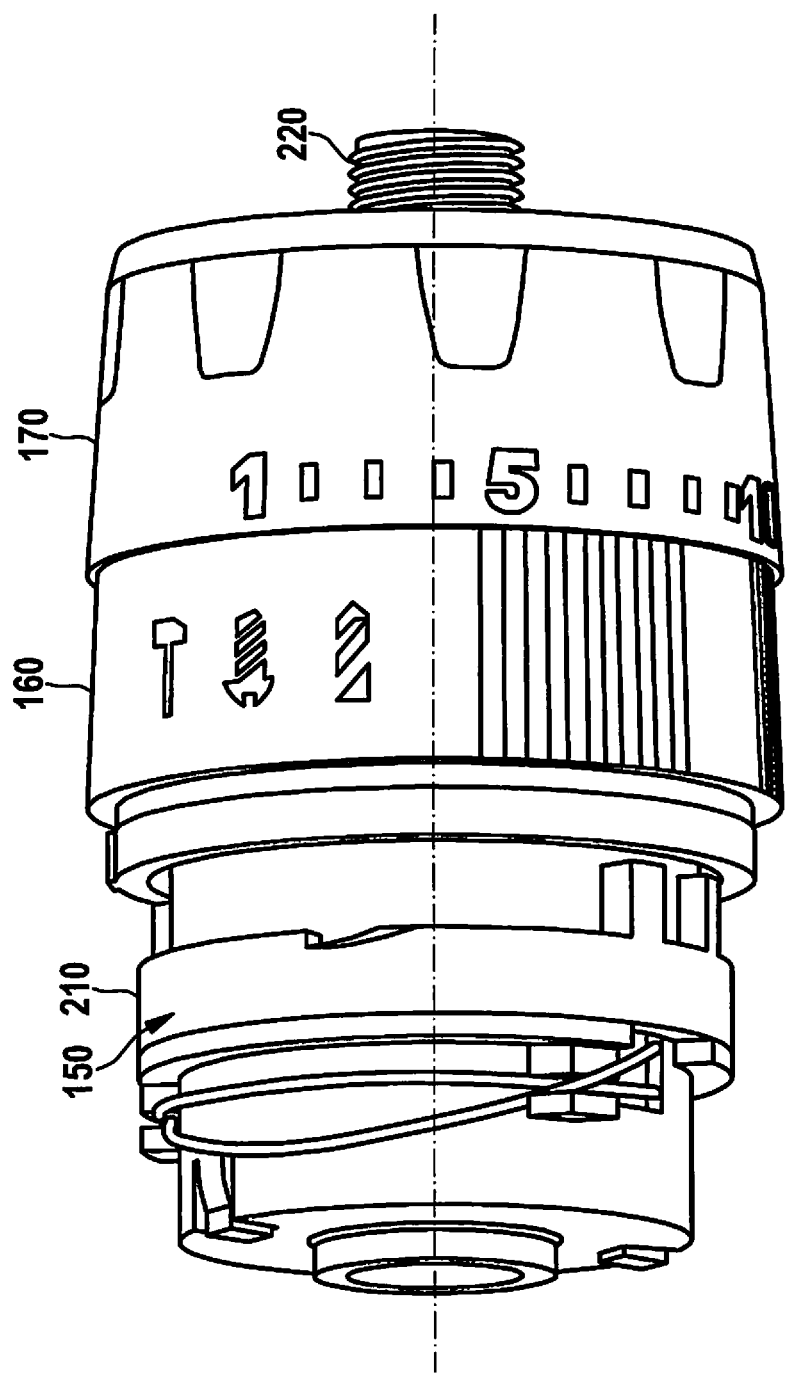
FIG. 2 shows a perspective section of the hand-held power tool including the gear and the mode-setting unit from FIG. 1.

FIG. 2 shows an exemplary assembly of hand-held power tool 100 from FIG. 1, without tool holder 180; the assembly includes, as demonstrated, gear 150, mode-setting unit 160, optional torque-limiting unit 170, and an output shaft 220. In this case, FIG. 2 shows a gear housing 210 assigned to gear 150.

Figure 3:
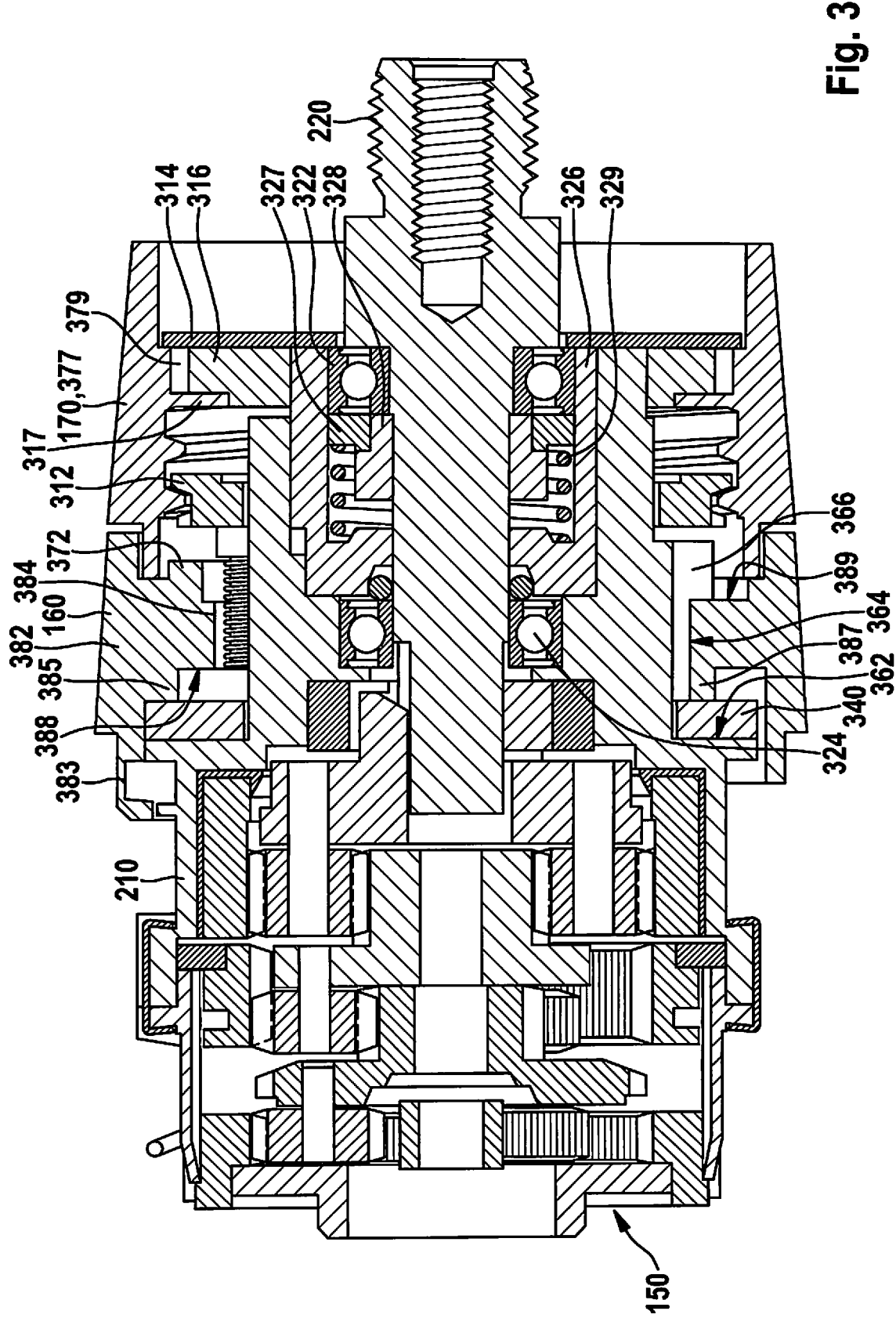
FIG. 3 shows a longitudinal section through the section from FIG. 2.

FIG. 3 shows the exemplary assembly of hand-held power tool 100 from FIG. 2 in an exemplary drilling position and shows mode-setting unit 160 and torque-limiting unit 170. Mode-setting unit 160 includes, by way of example, an actuating element 382 designed in the shape of a sleeve, as demonstrated, as well as a setting element 384 which is connected to this actuating element in a rotatably fixed manner and is also designed in the shape of a sleeve, as demonstrated. Setting element 384 is coupled to actuating element 382 in this case.

Actuating element 382 and setting element 384 are preferably formed as one piece, preferably from plastic, at least in some areas. In this case, actuating element 382 and setting element 384 are supported in the axial direction of output shaft 220 on a side 389 of gear housing 210 facing a free end of output shaft 220. Preferably, an operating mode is settable by way of a rotation of setting element 384, which is effectuatable via a rotation of actuating element 382.

Mode-setting unit 160 is preferably essentially immovably fixed in the axial direction of output shaft 220 on gear housing 210 via a fastening element 383. For this purpose, gear housing 210 preferably includes at least one recess 364 for accommodating sections of setting element 384. In this case, setting element 384 preferably establishes a particular rotation position of mode-setting unit 160. Setting element 384 is preferably designed as a type of detent spring. Recess 364 forms, as demonstrated, an axial support element 366 for axially supporting setting element 384 in the direction of the free end of output shaft 220.

Preferably, setting element 384 is coupled, at least in one operating mode, to a transmission element 340 which is mounted on gear housing 210 and is axially displaceable on gear housing 210 in a screwing position assigned to the screwing mode and is axially fixed on gear housing 210 in impact drilling and drilling positions assigned to the impact drilling and drilling modes. According to one specific embodiment, transmission element 340 is designed in the shape of a disk, in the manner of a pressure plate or a pressure ring. In this case, transmission element 340 preferably rests against a side 362 of gear housing 210 facing output shaft 220, specifically against associated balls or roll-shaped elements. Transmission element 340 is preferably connected to gear housing 210 in a rotatably fixed manner. In addition, transmission element 340 and setting element 384 are rotatable relative to each other.

In addition, mode-setting unit 160 preferably includes at least one blocking element 385, 387, via which transmission element 340 is axially fixed in the assigned impact drilling or drilling position on gear housing 210 in the impact-drilling or drilling mode. In the screwing mode, the at least one blocking element 385, 387 preferably unblocks transmission element 340 in the axial direction. Preferably, the at least one blocking element 385, 387 is situated on a side 388 of actuating element 382 facing away from the free end of output shaft 220. The at least one blocking element 385 is preferably formed as one piece with setting element 384.

For example, mode-setting unit 160 in an exemplary screwing position is axially fixed—toward the left in FIG.

3—by way of the at least one blocking element 385 resting against gear housing 210. In an exemplary impact drilling or drilling position, mode-setting unit 160, by way of example, is axially fixed—toward the left in FIG. 3—by way of the at least one blocking element 385 resting against transmission element 340.

According to one specific embodiment, optional torque-limiting unit 170 includes a torque sleeve 377 which is axially fixed in position on gear housing 210 and engages via its female thread into the male thread of a spring retaining ring 312. Spring retaining ring 312 is fitted on gear housing 210, preferably in a rotatably fixed but axially movable manner. This takes place, by way of example, with the aid of screws (412 in FIG. 4) which connect a retaining plate 314 to gear housing 210. Retaining plate 314 preferably encompasses output shaft 220 and presses a detent spring holder 316 against an annular shoulder 317 in torque sleeve 377, so that torque sleeve 377 is also axially secured on gear housing 210 in this way. In order to ensure that torque sleeve 377 latches in discrete detent positions during a rotation for the purpose of setting a maximum transmissible torque, force is preferably applied onto this torque sleeve by a detent spring element 379 which is held on detent spring holder 316. Detent spring holder 316 and detent spring element 379 are preferably situated in an interior space enclosed by torque sleeve 377. Detent spring element 379 preferably latches into place in discrete angle positions by way of, for example, detent spring element 379 acting upon a detent contour on an inner side of torque sleeve 377.

Output shaft 220 is rotatably mounted in gear housing 210, as demonstrated, via two axially spaced apart bearing elements 322, 324 which are preferably designed as ball bearings. In addition to the rotary motion, output shaft 220 may also carry out an axial actuating motion with respect to gear housing 210. For this purpose, ball bearing 322 is preferably axially fixedly connected to output shaft 220 and is displaceably mounted within a detent pot 326 which is connected to the housing. Ball bearing 324 is preferably situated in gear housing 210 so as to be fixed to the housing.

Output shaft 220 is preferably displaced between an impact drilling position and a drilling or screwing position by way of an axial actuating motion. In the impact drilling position, output shaft 220 may be displaced toward the left, as demonstrated, in FIG. 2, i.e., into gear housing 210. Detent pot 326 preferably enters into detent engagement with a detent disk 328 which is rotatably fixedly fitted on the lateral surface of output shaft 220 and, together with detent pot 326, forms a detent mechanism. Detent disk 328 also has the task of axially fixing ball bearing 322, which is also fitted on the lateral surface of output shaft 220, on this lateral surface. Preferably situated within detent pot 326 is a spring element 329 which, by way of a locking part 327 and ball bearing 322, forces output shaft 220 into an assigned outer detent position, in which detent pot 326 and detent disk 328 are not engaged.

For the purpose of deactivating detent mechanism 326, 328, setting element 384 preferably includes at least one and preferably three deactivating elements 372. The at least one deactivating element 372 is preferably formed as one piece with setting element 384. The at least one blocking element 385 and/or the at least one deactivating element 372 are/is formed as one piece with setting element 384.

Moreover, gear 150 is designed as a planetary gear set, by way of example. In this case, planetary gear set 150 preferably includes at least one planetary stage; as demonstrated, three planetary stages are included. Since the basic configuration and the mode of operation of planetary gear sets are sufficiently known to those skilled in the art, however, a detailed description of gear 150 is dispensed with here for the sake of simplicity of the description.

Figure 4:
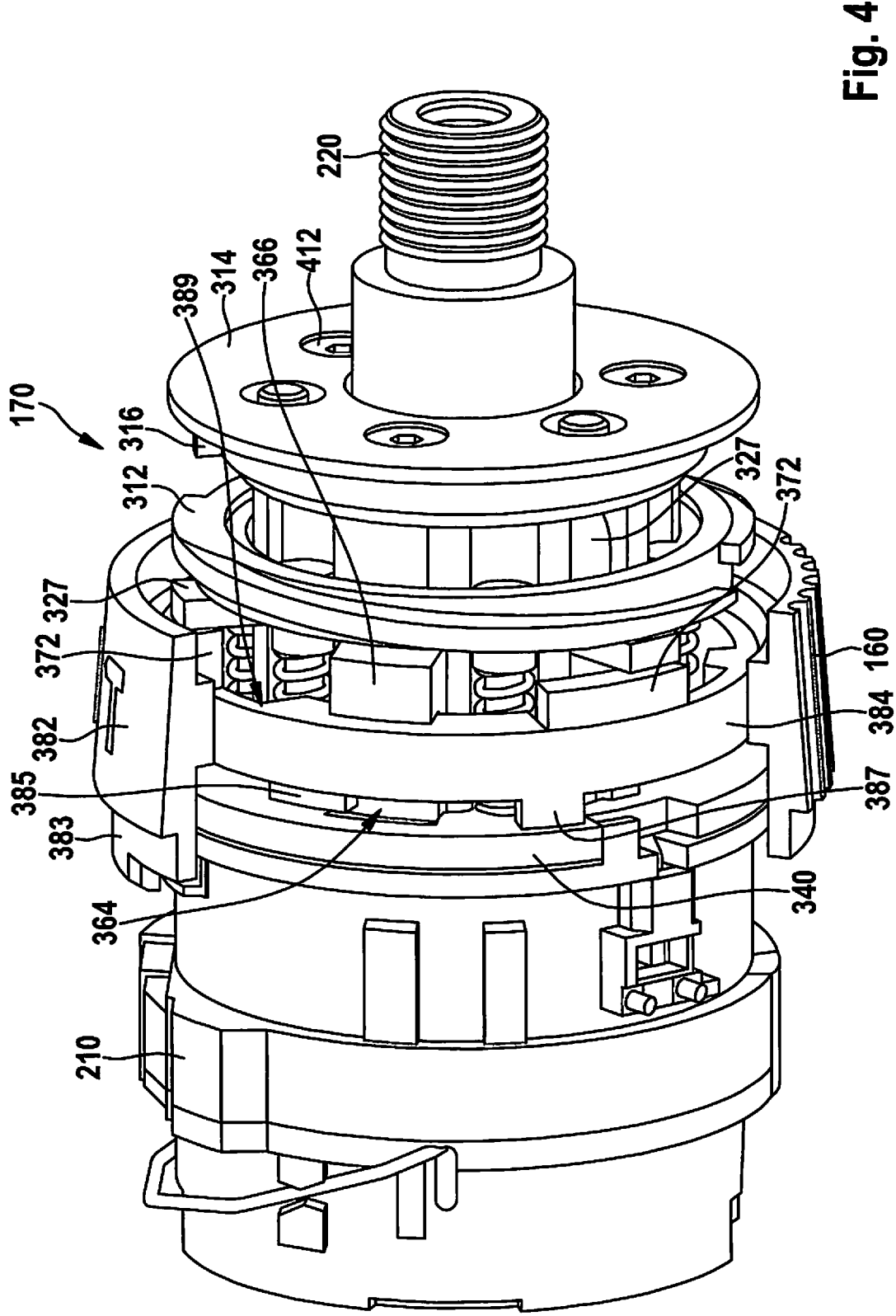
FIG. 4 shows a perspective view of the section from FIG. 2 and FIG. 3, the mode-setting unit being represented in a partial cutaway view.

FIG. 4 shows gear 150 situated in gear housing 210 from FIG. 3, mode-setting unit 160, torque-limiting unit 170, and output shaft 220, mode-setting unit 160 being represented in a partial cutaway view in order to show mode-setting unit 160 and torque-limiting unit 170, and torque-limiting unit 170 is shown without torque sleeve 377 from FIG. 3. In this case, FIG. 4 shows mode-setting unit 160 including actuating element 382 and setting element 384 as well as blocking elements 385, 387 and deactivating elements 372 from FIG. 3. In this case, blocking element 385 rests against transmission element 340, as demonstrated, and blocks it. Moreover, FIG. 4 shows the arrangement of setting element 384 in recess 364 and shows axial support element 366 of setting element 384, which supports setting element 384 in the direction of the free end of output shaft 220.

In addition, locking part 327 rests against deactivating elements 372 of mode-setting unit 160 via its axial end facing away from output shaft 220 and rests against an outer ring assigned to ball bearing 322 via its axial end facing output shaft 220.

Locking part 327 is preferably used for sampling deactivating elements 372 and transmitting the sampling to ball bearing 322 and, therefore, to detent disk 328 of detent mechanism 326, 328. In this case, axial changes in height on the adjusting contour on mode-setting unit 160, which are predefined by deactivating elements 372, are transmitted to detent disk 328 by way of the contact with locking part 327, so that detent disk 328 undergoes a corresponding axial change in position. The detent engagement between detent disk 328 and detent pot 326 may be controlled in this way. Detent mechanism 326, 328 is deactivated in the screwing mode and in the drilling mode. In the impact-drilling mode, locking part 327 does not rest against deactivating elements 372, so that detent disk 328 and detent pot 326 may enter into detent engagement.

Moreover, FIG. 4 shows retaining plate 314 which, by way of example, is fastened on gear housing 210 with the aid of at least one screw 412. As demonstrated, retaining plate 314 is fastened on gear housing 210 with the aid of three screws 412.

Figure 5:
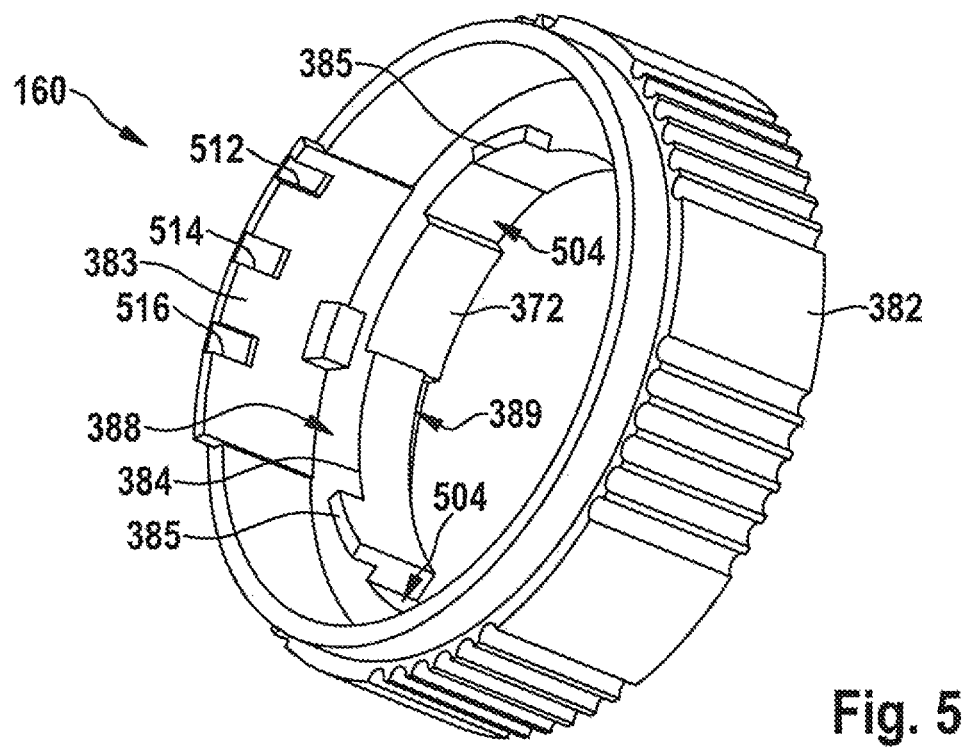
FIG. 5 shows a perspective view of the mode-setting unit from FIG. 1 through FIG. 4, as viewed from a first side.

FIG. 5 shows mode-setting unit 160 from FIG. 3, as viewed from side 388 from FIG. 3, which faces away from output shaft 220 from FIG. 3, and shows an inner contour including at least one recess 504; as demonstrated, two such recesses are included. Recesses 504 are preferably used for mounting mode-setting unit 160 on gear housing 210. Moreover, FIG. 5 shows two blocking elements 385, as demonstrated, preferably three blocking elements—which are preferably equidistantly spaced apart in the circumferential direction—being provided, however.

For the purpose of setting the operating mode, locking part 327 is preferably displaceable, via its end facing away from output shaft 220, along side 389 of mode-setting unit 160 facing output shaft 220. In addition, FIG. 5 shows fastening element 383 from FIG. 3, by way of which mode-setting unit 160 is fixable on gear housing 220. In this case, fastening element 383 preferably includes at least one detent recess; as demonstrated, three detent recesses 512, 514, 516 are included, one detent recess 512, 514, 516 being assigned to one operating mode in each case.

Figure 6:
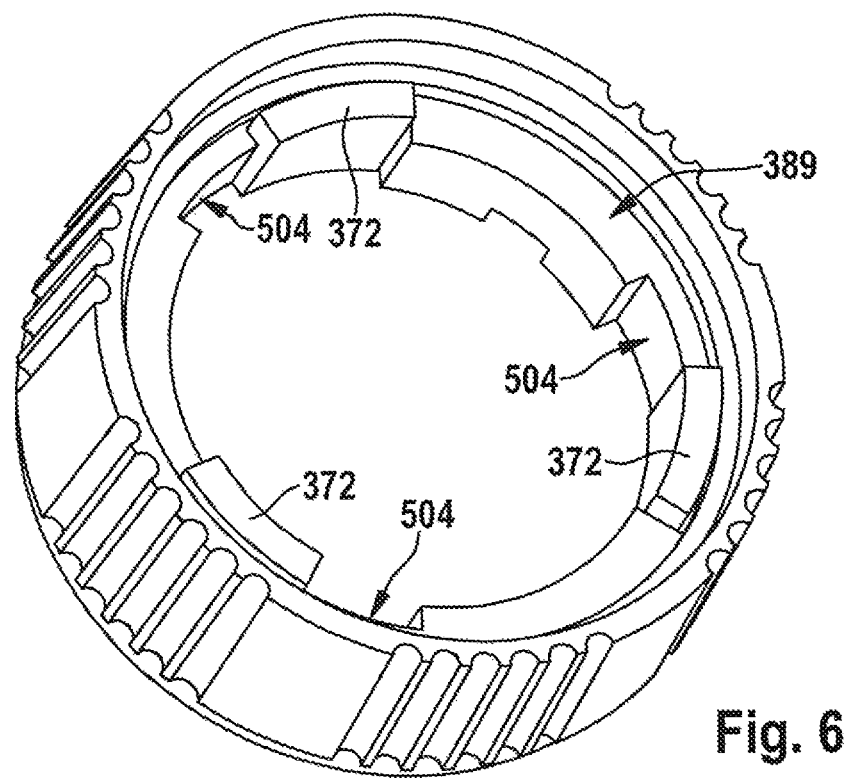
FIG. 6 shows a perspective view of the mode-setting unit from FIG. 5, as viewed from a second side.

FIG. 6 shows mode-setting unit 160 from FIG. 3 as viewed from side 389 from FIG. 3, which faces output shaft 220. In this case, FIG. 6 shows the at least one recess 504—three such recesses as demonstrated—from FIG. 5, and the at least one deactivating element 372—three such deactivating elements as demonstrated—from FIG. 3.

Figure 7:
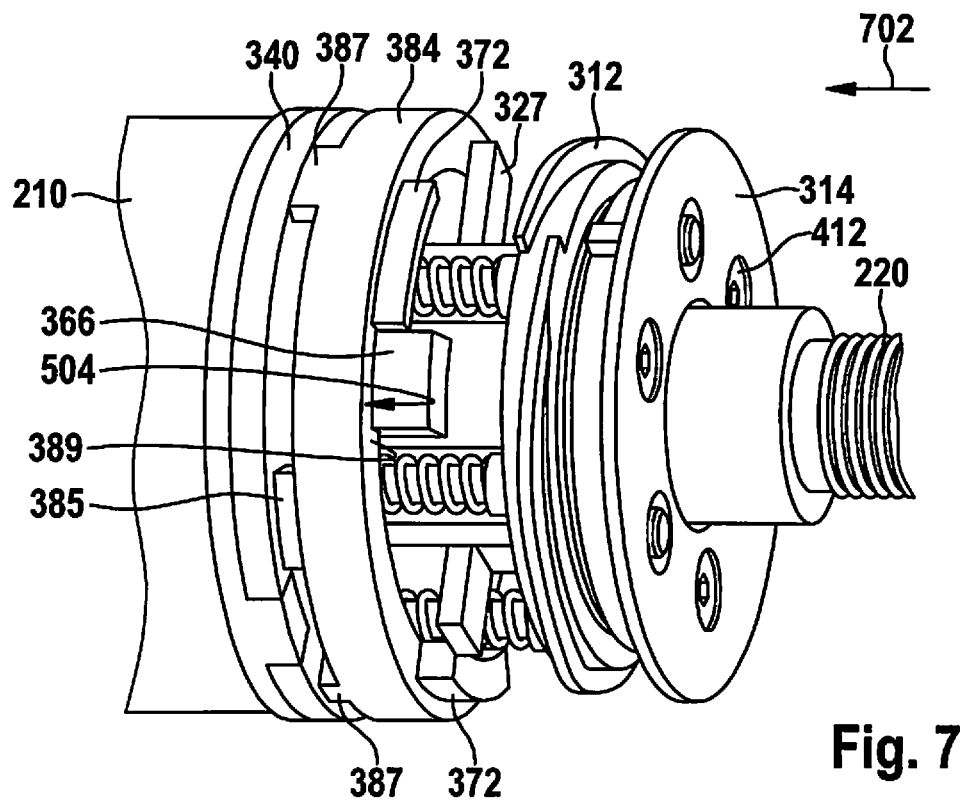
FIG. 7 shows a perspective view of the mode-setting unit from FIG. 5, in an installation position.

FIG. 7 shows mode-setting unit 160 from FIG. 3 in an installation position, actuating element 382 and torque sleeve 377 from FIG. 3 not being represented, for the sake of clarity. In the installation position, the at least one recess 504 from FIG. 5 of mode-setting unit 160 is preferably situated in the area of support element 366 from FIG. 3 of gear housing 220, so that mode-setting unit 160 may be slid via support element 366 in the direction of transmission element 340 or in the direction of an arrow 702. An operating mode may be set by rotating mode-setting unit 160, for example, a screwing mode (see FIG. 8), a drilling mode (see FIG. 9), and/or an impact-drilling mode (see FIG. 10).

Figure 8:
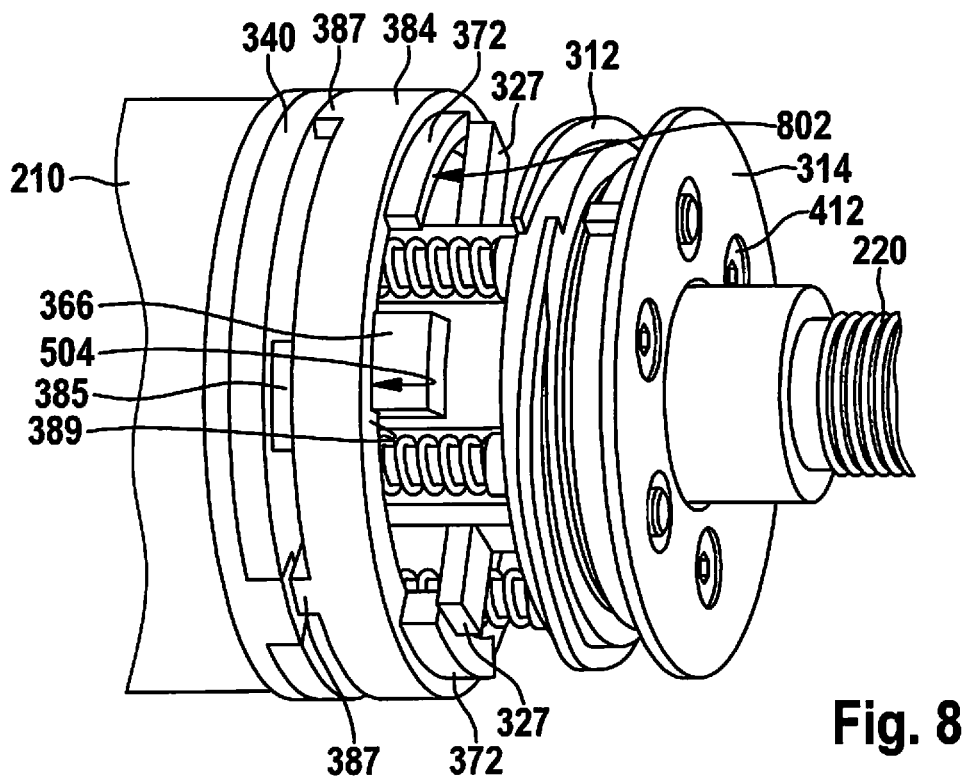
FIG. 8 shows a perspective view of the mode-setting unit from FIG. 5, in a screwing mode.

FIG. 8 shows mode-setting unit 160 from FIG. 3 in the screwing mode, actuating element 382 and torque sleeve 377 from FIG. 3 not being represented, for the sake of clarity. In the screwing mode or a screwing position of mode-setting unit 160, the two locking parts 327—as demonstrated—from FIG. 3 preferably rest on or against a side 802 of a particular deactivating element 372 facing output shaft 220. In this case, deactivating elements 372 preferably deactivate detent mechanism 326, 328 from FIG. 3 and therefore prevent a generation of impacts. In the screwing position of mode-setting unit 160, however, transmission element 340 from FIG. 3 is preferably unblocked and may move axially or is coupled to optional torque-limiting unit 170 from FIG. 1. In this case, when the maximum transmissible torque set by way of torque-limiting unit 170 is exceeded, transmission element 340 moves axially and decouples gear 150 from output shaft 220.

Figure 9:
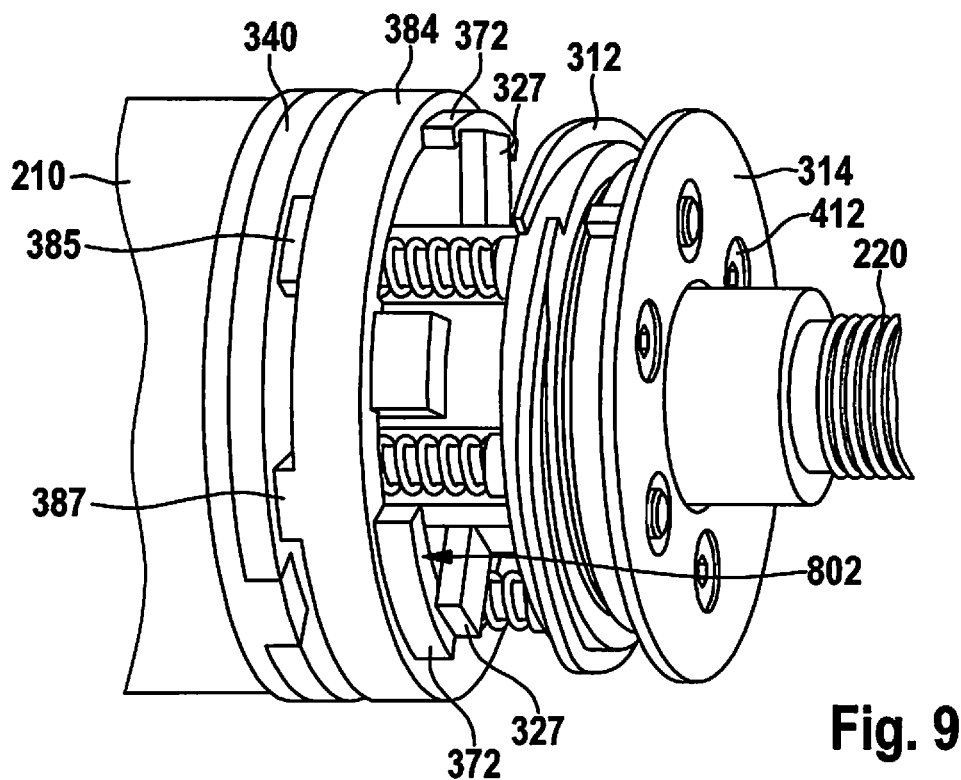
FIG. 9 shows a perspective view of the mode-setting unit from FIG. 5, in a drilling mode.

FIG. 9 shows mode-setting unit 160 from FIG. 3 in the drilling mode, actuating element 382 and torque sleeve 377 from FIG. 3 not being represented, for the sake of clarity. In the drilling mode or a drilling position of mode-setting unit 160, the two locking parts 327—as demonstrated—preferably rest on or against a side 802 of a particular deactivating element 372 facing output shaft 220. For the purpose of setting the drilling mode starting from the screwing or impact-drilling mode, mode-setting unit 160 is rotated in the circumferential direction, whereby deactivating element 372 is also rotated in the circumferential direction. Similarly to the screwing mode, deactivating elements 372 deactivate detent mechanism 326, 328 from FIG. 3 and therefore prevent a generation of impacts. In the drilling position, blocking elements 385, 387 block transmission element 340, whereby optional torque-limiting unit 170 is deactivated.

Figure 10:
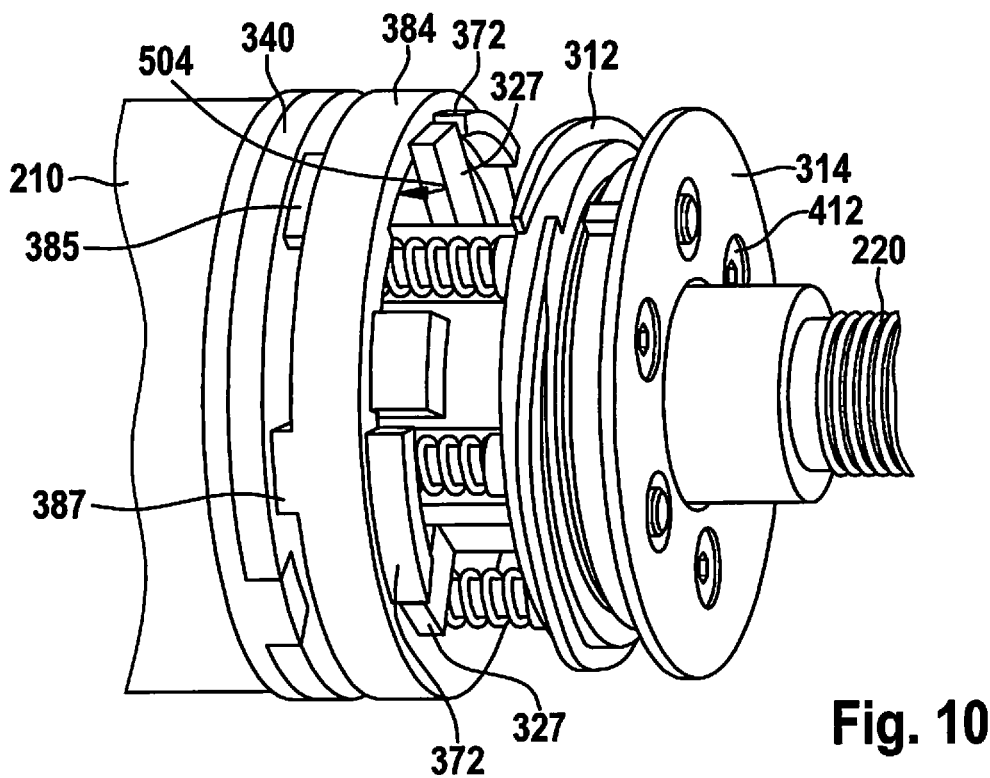
FIG. 10 shows a perspective view of the mode-setting unit from FIG. 5, in an impact drilling mode.

FIG. 10 shows mode-setting unit 160 from FIG. 3 in the impact drilling mode, actuating element 382 and torque sleeve 377 from FIG. 3 not being represented, for the sake of clarity. In the impact drilling mode or an impact drilling position of mode-setting unit 160, locking parts 327 from FIG. 3 are situated between two adjacent deactivating elements 372 from FIG. 3. As demonstrated, locking parts 327 are situated in the area of recesses 504 from FIG. 6. In this case, deactivating elements 372 unblock detent mechanism 326, 328 from FIG. 3 and make it possible for impacts to be generated. Similarly to the drilling position, blocking elements 385, 387 block transmission element 340 in this case, whereby optional torque-limiting unit 170 is deactivated.

What is claimed is:

1. A hand-held power tool, comprising:
   a gear for driving an output shaft, which is situated in an assigned gear housing;
   a mode-setting unit for setting an operating mode for an impact drilling mode, a drilling mode, and a screwing mode, the mode-setting unit including a rotatable actuating element and a rotatable setting element coupled to the rotatable actuating element, one of the operating modes being settable by way of a rotation of the setting element, which is effectuatable via a rotation of the actuating element, and the setting element being coupled, at least in one operating mode, to a transmission element which is mounted on the gear housing and is axially displaceable on the gear housing in a screwing position assigned to the screwing mode and is axially fixed on the gear housing in an impact drilling position and a drilling position assigned to the impact drilling mode and the drilling mode;
   wherein the actuating element and the setting element are formed as one piece from plastic and have a supporting face configured for being supported against an axial support element of the gear housing in the axial direction of the output shaft on a side of the gear housing facing a free end of the output shaft,
   wherein the setting element is disposed between the axial support element and the transmission element in the axial direction of the output shaft,
   wherein the mode-setting unit includes at least one blocking element, by way of which the transmission element is axially fixed in the assigned impact drilling or drilling position on the gear housing in the impact-drilling or drilling mode, the at least one blocking element unblocking the transmission element in the axial direction in the screwing mode;
   wherein the supporting face and the at least one blocking element of the mode-setting unit are situated on a side of the transmission element facing a free end of the output shaft.

2. The hand-held power tool as recited in claim 1, wherein the gear housing includes at least one recess for accommodating sections of the setting element.

3. The hand-held power tool as recited in claim 2, wherein the at least one recess forms the axial support element for axially supporting the setting element in a direction of a free end of the output shaft.

4. The hand-held power tool as recited in claim 3, wherein the axial support element is disposed at least in parts in a circumferential direction of the gear housing relative to the output shaft.

5. The hand-held power tool as recited in claim 2, wherein the at least one recess is disposed at least in sections in a circumferential direction of the gear housing relative to the output shaft.

6. The hand-held power tool as recited in claim 2, wherein the at least one recess is configured to accommodate the setting element at least in sections in a circumferential direction of the gear housing relative to the output shaft.

7. The hand-held power tool as recited in claim 1, wherein the actuating element and the setting element are both in the shape of a sleeve.

8. The hand-held power tool as recited in claim 1, wherein the at least one blocking element is situated on a side of the actuating element facing away from the free end of output shaft.

9. The hand-held power tool as recited in claim 1, further comprising:
   a detent mechanism for generating impacts in the impact drilling mode, the detent mechanism being assigned to the output shaft, wherein the setting element includes at least one deactivating element for deactivating the detent mechanism.

10. The hand-held power tool as recited in claim 9, wherein at least one of: (i) the at least one blocking element, and (ii) the at least one deactivating element, is formed as one piece with setting element.

11. The hand-held power tool as recited in claim 1, wherein the transmission element is rotatably fixedly connected to the gear housing.

12. The hand-held power tool as recited in claim 1, wherein the setting element and the transmission element are rotatable relative to each other.

13. The hand-held power tool as recited in claim 1, wherein the transmission element is in the shape of a disk.

14. The hand-held power tool as recited in claim 1, wherein the mode-setting unit includes a fastening element which is configured to fix the mode-setting unit on the gear housing, wherein the fastening element includes a detent recess.

15. The hand-held power tool as recited in claim 1, wherein the at least one blocking element is disposed between the setting element and the transmission element in the axial direction of the output shaft.

\* \* \* \* \*